United States Patent
Hayakawa

(10) Patent No.: US 7,642,913 B2
(45) Date of Patent: Jan. 5, 2010

(54) SENSOR APPARATUS

(75) Inventor: Junji Hayakawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 11/987,298

(22) Filed: Nov. 29, 2007

(65) Prior Publication Data
US 2008/0136627 A1 Jun. 12, 2008

(30) Foreign Application Priority Data
Dec. 11, 2006 (JP) ............................... 2006-332893

(51) Int. Cl.
*G08B 21/00* (2006.01)
(52) U.S. Cl. ...................... 340/540; 340/467; 340/669; 324/661; 324/679; 73/514.32; 73/1.38
(58) Field of Classification Search ................ 340/540, 340/441, 466, 467, 669, 670, 671; 324/661, 324/679, 160, 162, 163, 168; 73/514.32, 73/1.38, 614.18, 514.01, 514.16
See application file for complete search history.

(56) References Cited
U.S. PATENT DOCUMENTS

| | | | |
|---|---|---|---|
| 5,465,070 A | 11/1995 | Koyama et al. | 327/350 |
| 5,610,547 A | 3/1997 | Koyama et al. | 327/350 |
| 6,483,322 B2 | 11/2002 | Aoyama et al. | 322/661 |
| 6,668,614 B2 * | 12/2003 | Itakura | 73/1.38 |
| 6,952,966 B2 * | 10/2005 | Itakura | 73/514.32 |
| 7,287,429 B2 * | 10/2007 | Umemura et al. | 73/514.32 |
| 7,432,724 B2 * | 10/2008 | Goto | 324/661 |
| 7,456,731 B2 * | 11/2008 | Umemura et al. | 340/436 |

FOREIGN PATENT DOCUMENTS

JP    A-2006-173888    6/2006

\* cited by examiner

*Primary Examiner*—Toan N Pham
(74) *Attorney, Agent, or Firm*—Posz Law Group, PLC

(57) ABSTRACT

A sensor apparatus includes a sensor circuit and a nonlinear signal processing circuit. The sensor circuit detects a physical quantity and outputs a detection signal indicative of the detected physical quantity. The signal processing circuit includes a logarithmic converter, an analog-to-digital converter, and an antilogarithmic converter. The logarithmic converter produces a logarithm signal corresponding to a logarithm of the detection signal. The analog-to-digital converter digitalizes the logarithm signal. The antilogarithmic converter produces an antilogarithmic signal corresponding to an antilogarithm of the digitalized logarithm signal.

8 Claims, 4 Drawing Sheets

US 7,642,913 B2

SENSOR APPARATUS

CROSS REFERENCE TO RELATED APPLICATION

This application is based on and incorporates herein by reference Japanese Patent Application No. 2006-332893 filed on Dec. 11, 2006.

FIELD OF THE INVENTION

The present invention relates to a sensor apparatus having a wide dynamic range and a high sensitivity.

BACKGROUND OF THE INVENTION

A sensor apparatus has been proposed that detects acceleration as a physical quantity. For example, a sensor apparatus disclosed in U.S. Pat. No. 6,483,322 corresponding to JP-A-200240047 includes a sensor circuit and a processing circuit. The sensor circuit detects a capacitance varying with acceleration applied thereto and outputs an acceleration signal indicative of the detected capacitance. The processing circuit processes the acceleration signal. The processing circuit has a function to convert the acceleration signal to a voltage signal and to linearly amplify the voltage signal.

When a physical quantity to be detected is small, a sensitivity (i.e., resolution) of a sensor circuit needs to be increased. In such a conventional sensor apparatus, an increase in a sensitivity of the sensor circuit results in a decrease in a dynamic range of the sensor circuit, because an output of the sensing circuit is limited to a power supply voltage. Therefore, if the sensitivity of the sensor circuit is increased to detect a small physical quantity, the sensor apparatus cannot detect a large physical quantity due to a small dynamic range.

One approach to detect a physical quantity at a high sensitivity over a wide range is to use multiple sensor circuits having different dynamic ranges. However, this approach requires multiple sensor circuits and multiple processing circuits for processing outputs of the respective sensor circuits. As a result, the sensor apparatus may be increased in size and cost.

SUMMARY OF THE INVENTION

In view of the above-described problem, it is an object of the present invention to provide a sensor apparatus having a wide dynamic range and a high sensitivity.

A sensor apparatus includes a sensor circuit and a signal processing circuit. The sensor circuit detects a physical quantity and outputs a detection signal indicative of the detected physical quantity. The signal processing circuit processes the detection signal received from the sensor circuit. The signal processing circuit includes a logarithmic converter, an analog-to-digital converter, and an antilogarithmic converter. The logarithmic converter produces a logarithm signal corresponding to a logarithm of the detection signal. The analog-to-digital converter digitalizes the logarithm signal. The antilogarithmic converter produces an antilogarithmic signal corresponding to an antilogarithm of the digitalized logarithm signal.

According to the sensor apparatus, the detection signal is used after being converted to the logarithm signal. As the detection signal is smaller, the logarithm signal is larger. As the detection signal is larger, the logarithm signal is smaller. Therefore, the dynamic range of the sensor circuit is greatly increased by using the logarithm signal. The detection signal is digitalized after being converted to the logarithm signal. In such an approach, even when the detection signal is small, the detection signal can be digitalized at high resolution so that high sensitivity can be ensured. Further, even when the detection signal is large, the detection signal can be digitalized without signal distortion so that high sensitivity can be ensured.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

Figure 1:
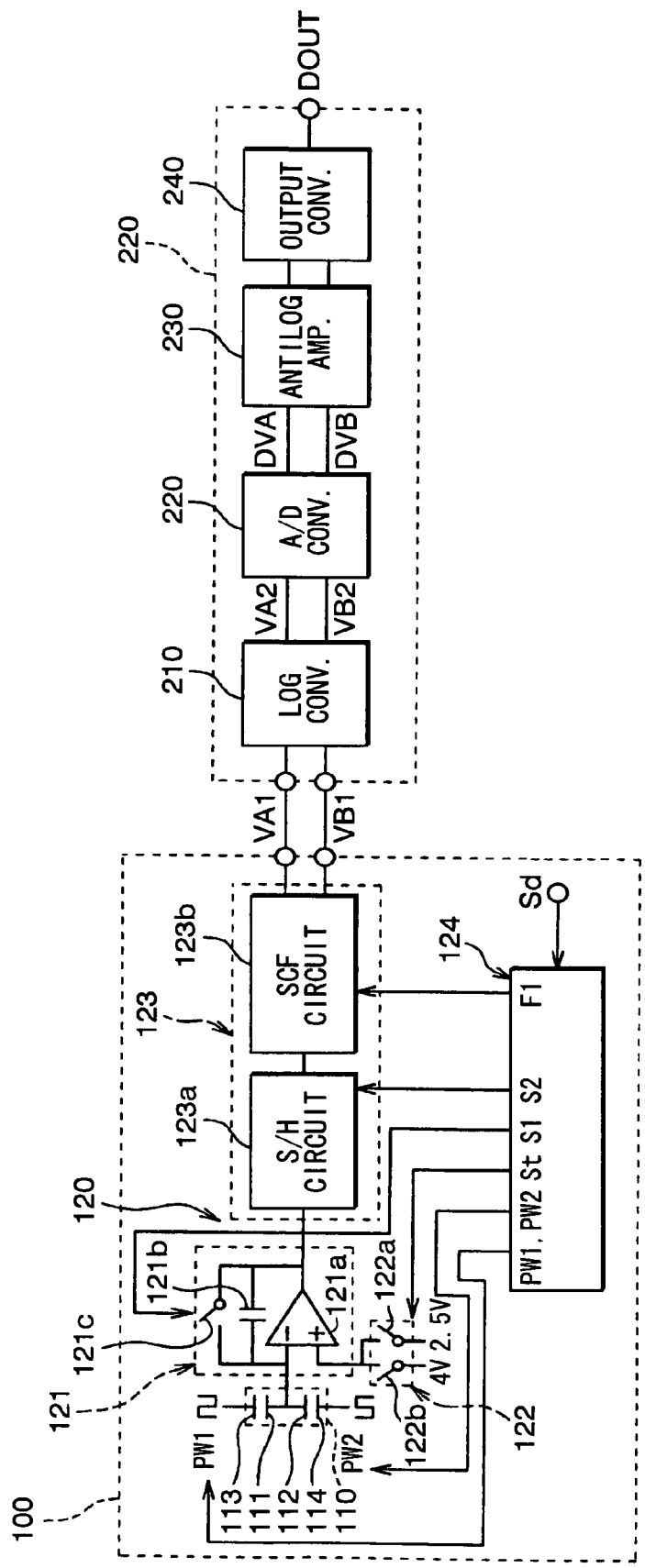
FIG. 1 is a diagram illustrating a sensor apparatus according to an embodiment of the present invention.

Referring to FIG. 1, a sensor apparatus according to an embodiment of the present invention includes a sensor circuit 100 and a nonlinear signal processing circuit 200. For example, the sensor apparatus can be installed in a vehicle to achieve a vehicle control such as an airbag control or a side-slip prevention.

The sensor circuit 100 detects a physical quantity. In the present embodiment, the sensor circuit 100 is configured as an acceleration sensor to detect acceleration. The sensor circuit 100 includes a sensor element 110 and a detection circuit 120.

The sensor element 110 includes a comb-shaped beam structure formed on a silicon substrate. The comb-shaped beam structure is constructed with movable electrodes 111, 112, and fixed electrodes 113, 114. The movable electrode 111 and the fixed electrode 113 are arranged opposite to each other, and the movable electrode 112 and the fixed electrode 114 are arranged opposite to each other. Thus, the sensor element 110 has a differential capacitance. Voltages having opposite polarities are periodically respectively applied to the fixed electrodes 113, 114. When the sensor circuit 100 receives acceleration, the movable electrodes 111, 112 are displaced according to the received acceleration. As a result, the differential capacitance changes according to the displacements of the movable electrodes 111, 112. The change in the differential capacitance is outputted as a detection signal.

The detection circuit 120 includes a capacitance to voltage (C/V) conversion circuit 121, a switch circuit 122, a signal processing circuit 123, and a control signal generation circuit 124.

The C/V conversion circuit 121 converts the change in the differential capacitance, which is outputted as the detection signal from the sensor element 110, to a voltage. The C/V conversion circuit 121 includes an operational amplifier 121*a*, a capacitor 121*b*, and a switch 121*c*. An inverting input terminal of the operational amplifier 121*a* is connected to each of the movable electrodes 111, 112. The capacitor 121b and the switch 121c are connected in parallel between the inverting input terminal and an output terminal of the operational amplifier 121a.

The switch 121c is driven based on a switch signal S1 outputted from the signal generation circuit 124. A first voltage or a second voltage is selectively applied through the switch circuit 122 to a non-inverting input terminal of the operational amplifier 121a. The first voltage is a midpoint voltage between the fixed electrodes 113, 114. The second voltage is a voltage different from the first voltage. In the present embodiment, for example, the first voltage is 2.5 volts, and the second voltage is 4 volts.

The switch circuit 122 receives the first and second voltages from respective voltage sources (not shown) and selectively applies the first voltage or the second voltage to the non-inverting input terminal of the operational amplifier 121a. The switch circuit 122 includes switches 122a, 122b. The switches 122a, 122b are driven based on a switch signal St outputted from the signal generation circuit 124. When one of the switches 122a, 122b is open, the other of the switches 122a, 122b is closed.

The signal processing circuit 123 includes a sample and hold (S/H) circuit 123a and a switched capacitor filter (SCF) circuit 123b. The S/H circuit 123a is driven based on a signal S2 outputted from the signal generation circuit 124. The S/H circuit 123a samples an output voltage of the C/V conversion circuit 121 and holds the sampled output voltage for a certain period of time.

The SFC circuit 123b is driven based on a clock signal F1 outputted from the signal generation circuit 124. The SFC circuit 123b extracts a predetermined frequency component from an output voltage of the S/H circuit 123a and outputs the extracted frequency component as an acceleration signal. In the present embodiment, the acceleration signal is outputted as signals VA1, VA2 to an outside of the sensor circuit 100. The signal VA1 is used for a signal processing, and the signal VA2 is used as a reference.

As described previously, the signal generation circuit 124 outputs the switch signal S1 fed to the switch 121c, the switch signal St fed to the switch circuit 122, the control signal S2 fed to the S/H circuit 123a, and the clock signal F1 fed to the SFC circuit 123b. Further, the signal generation circuit 124 outputs voltage application timing signals PW1, PW2 to the fixed electrodes 113, 114, respectively. The signal generation circuit 124 has a self-diagnosis function that is enabled in response to a self-diagnosis signal Sd. When the self-diagnosis function is enabled, the sensor element 110 performs self-diagnosis of acceleration detected by the sensor element 110.

The non-linear signal processing circuit 200 includes a logarithmic converter 210, an analog-to-digital (A/D) converter 220, an antilog amplifier 230, and an output converter 240.

Figure 2:
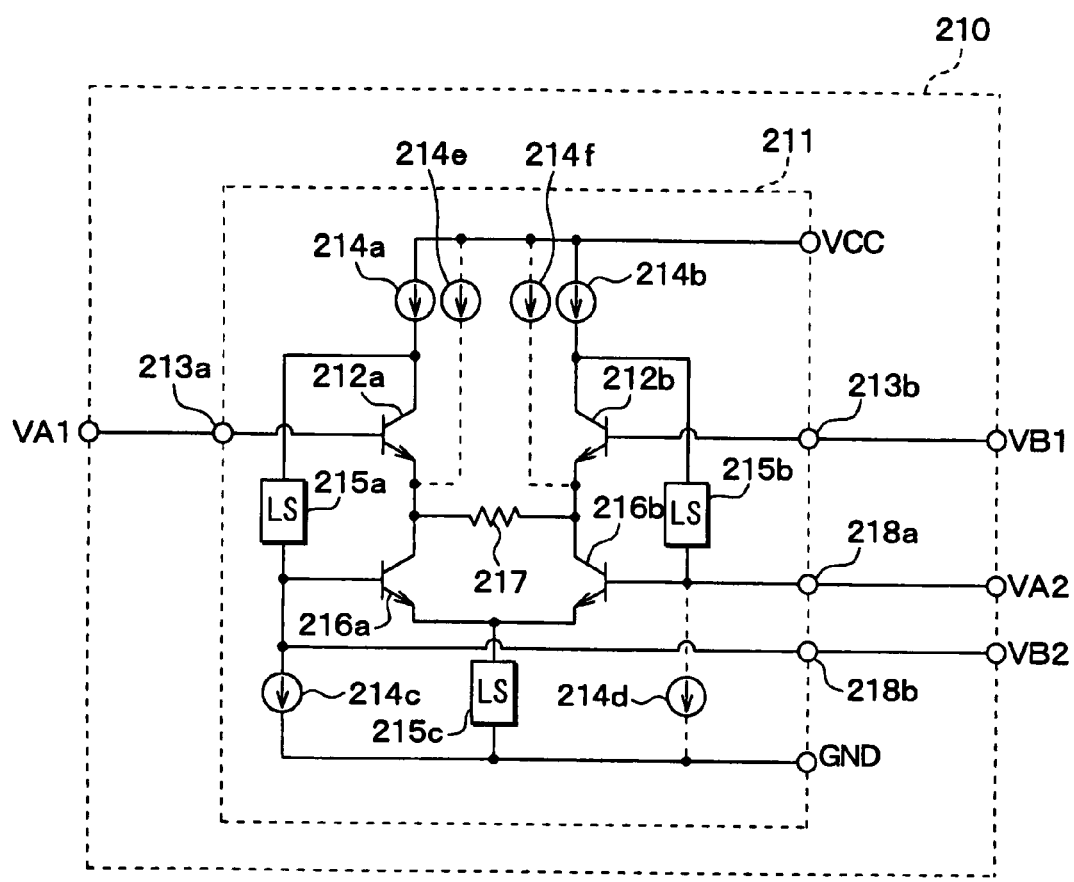
FIG. 2 is a diagram illustrating a logarithmic converter in the sensor apparatus of FIG. 1.

The logarithmic converter 210 receives the signals VA1, VA2 (i.e., acceleration signal) from the sensor circuit 100. The logarithmic converter 210 has a logarithmic conversion circuit 211 for performing a logarithmic conversion of the signals VA1, VA2. For example, the logarithmic conversion circuit 211 is configured as shown in FIG. 2.

The logarithmic conversion circuit 211 has transistors 212a, 212b that construct a differential input stage for amplifying an input signal. Bases of the transistors 212a, 212b are connected to input terminals 213a, 213b of the logarithmic conversion circuit 211, respectively. Collectors of the transistors 212a, 212b are connected to a power supply VCC thought current sources 214a, 214b, respectively. Further, the collectors of the transistors 212a, 212b are connected to bases of transistors 216a, 216b thought level shift (LS) circuits 215a, 215b, respectively.

Collectors of the transistors 216a, 216b are connected to emitters of the transistors 212a, 212b, respectively. A degeneration resistor 217 acting as an impedance element is connected between the collectors of the transistors 216a, 216b (i.e., emitters of the transistors 212a, 212b). The emitters of the transistors 216a, 216b are connected to each other and connected to a ground GND through a common level shift circuit 215c.

Further, the bases of the transistors 216a, 216b are respectively connected to output terminals 218a, 218b of the logarithmic conversion circuit 211. The signal VA1 is inputted to the logarithmic conversion circuit 211 through the input terminal 213a and logarithmically converted to a signal VA2. Likewise, the signal VB1 is inputted to the logarithmic conversion circuit 211 through the input terminal 213b and logarithmically converted to a signal VB2. The signals VA2, VB2 are outputted from the logarithmic conversion circuit 211 through the output terminals 218a, 218b, respectively.

In the logarithmic conversion circuit 211, the signals VB1, VB2 inputted to the input terminals 213a, 213b are converted to electric currents by the transistors 212a, 212b. Specifically, the electric currents are proportional to the signals VB1, VB2 and flow through the emitters of the transistors 212a, 212b, respectively. Then, the emitter currents of the transistors 212a, 212b flow into the collectors of the transistors 216a, 216b, respectively.

There is a logarithmic relationship between the collector currents and base-emitter voltages of the transistors 216a, 216b. Therefore, the collector currents of the transistors 216a, 216b are logarithmically converted to the base-emitter voltages of the transistors 216a, 216b and outputted as the signals VA2, VB2 through the output terminals 218a, 218b.

The logarithmic conversion circuit 211 further includes current sources 214c-214f if necessary. The current sources 214c, 214d are used to determine operating currents of the level shift circuits 215a, 215b. The current sources 214e, 214f allow operating currents of the transistors 216a, 216b to be greater than operating currents of the transistors 212a, 212b so that an input impedance of the logarithmic conversion circuit 211 can be increased.

Figure 3:
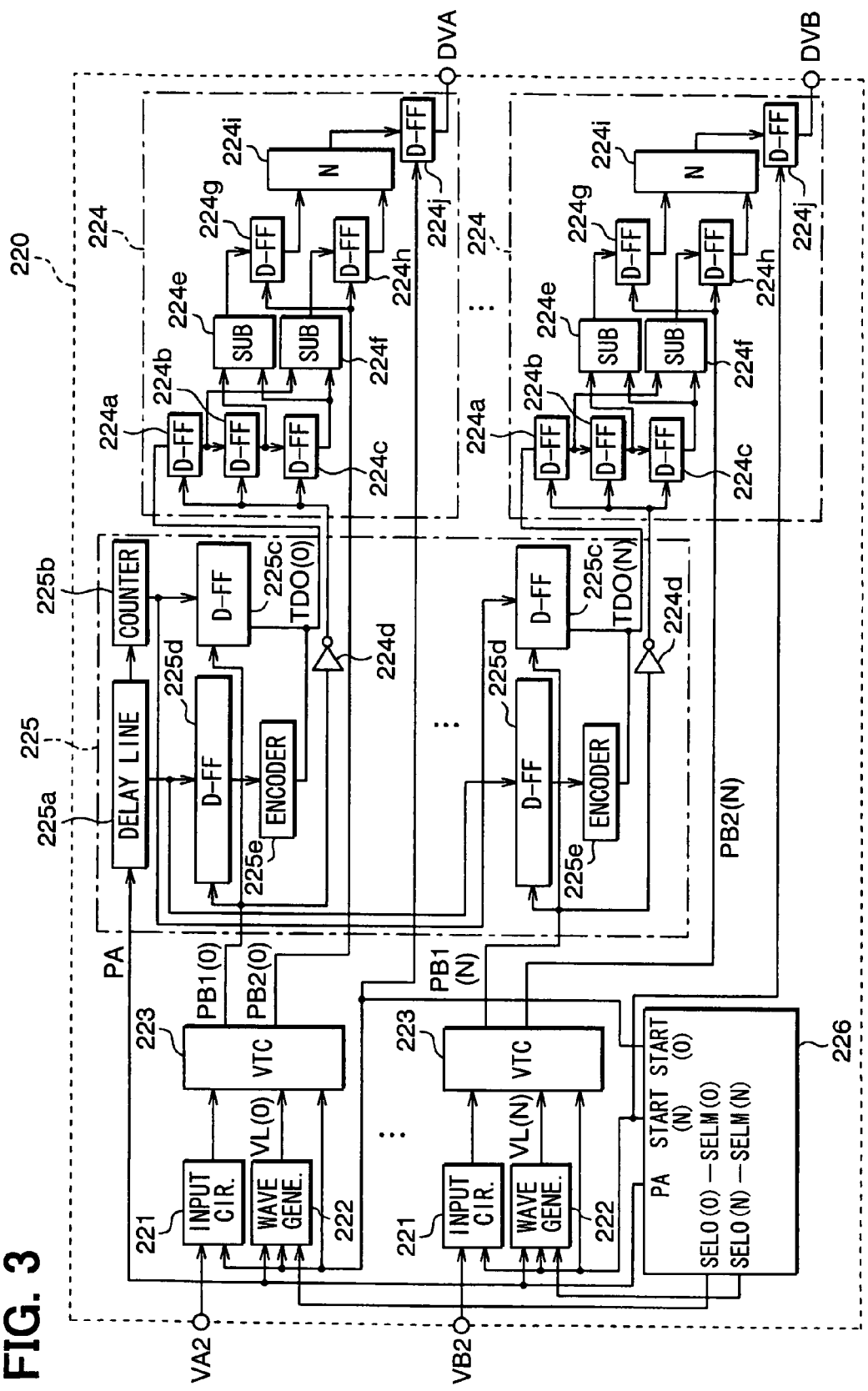
FIG. 3 is a diagram illustrating an analog-to-digital converter in the sensor apparatus of FIG. 1.

The A/D converter 220 performs an A/D conversion of the signals VA2, VB2 outputted from the logarithmic conversion circuit 211. As shown in FIG. 3, the A/D converter 220 are configured so that N input signals can be A/D-converted at a time, where N is a positive integer. In the present embodiment, since two input signals VA2, VB2 are A/D-converted at a time, at least two channels are required. Therefore, in FIG. 3, only the first channel and the Nth channel are described, and the 2nd through (N-1)th channels are omitted. Signals associated with the first and Nth channels are labeled (0), (N), respectively.

The A/D converter 220 includes N input processing circuits 221, N lamp waveform generation circuits 222, N voltage-time converter (VTC) 223, N calculation circuits 224, a pulse phase difference encoding circuit 225, a control circuit 226, where N is a positive integer. Whereas the N input processing circuits 221, the N lamp waveform generation circuits 222, the N voltage-time converters 223, and the N calculation circuits 224 are respectively provided to the N channels of the A/D converter 220, the encoding circuit 225 and the control circuit 226 are shared (i.e., common) between the N channels of the A/D converter 220.

The encoding circuit 225 includes a ring delay line circuit 255a, a counter 255b, N D-type flip-flops 255c for a counter, N D-type flip-flops 255d for a pulse selector, and N encoders 255e, where N is a positive integer. Whereas the N D-type flip-flops 255c and the N D-type flip-flops 255d are respectively provided to the N channels, the ring delay line circuit 255a and the counter 255b are shared (i.e., common) between the N channels.

The input processing circuit 221 provided to the first channel samples and holds the input signal VA2 in accordance with a signal START(0). Likewise, the input processing circuit 221 provided to the Nth channel samples and holds the input signal VB2 in accordance with a signal START(N). Thus, the AD conversions of the input voltages VA2, VB2 are respectively started in response to the signals START (0), START (N). The signals START (0), START(N) are outputted from the control circuit 26 at respective time intervals, which are set so that the AD conversions can be performed by suitable resolutions.

The lamp waveform generation circuit 222 provided to the first channel receives one of selection signals SEL0(0)-SELM (0) from the control circuit 226, where M is a positive integer. The lamp waveform generation circuit 222 generates a lamp waveform voltage VL(0) having a constant gradient determined by the received one of the selection signals SEL0(0)-SELM(0). Likewise, the lamp waveform generation circuit 222 provided to the Nth channel receives one of selection signals SEL0(N)-SELM(N) from the control circuit 226 and generates a lamp waveform voltage VL(N) having a constant gradient determined by the received one of the selection signals SEL0(N)-SELM(N).

The voltage-time converter 223 provided to the first channel generates signals PB1(0), PB2(0) based on the held voltage VA2, the lamp waveform voltage VL(0), the signal START(0), and a signal PA outputted from the control circuit 26. Likewise, the voltage-time converter 223 provided to the Nth channel generates signals PB1(N), PB2(N) based on the held voltage VB2, the lamp waveform voltage VL(N), the signal START(N), and the signal PA.

The calculation circuit 224 provided to the first channel produces an normalized A/D conversion code AD(0) given by the following equation:

$$AD(0)=(2^m-1)\times\{DOb(0)-DOa(0)\}/\{DOc(0)-DOa(0)\} \quad (1)$$

In the equation (1), DOa(0) represents digital data corresponding to the PB1(0) generated when the lamp wavelength voltage VL(0) starts increasing from 0 volt, DOb(0) represents digital data corresponding to the PB1(0) generated when the lamp wavelength voltage VL(0) becomes equal to the input voltage VA2, and DOc(0) represents digital data corresponding to the PB1(0) generated when the lamp wavelength voltage VL(0) becomes equal to a power supply voltage.

Likewise, the calculation circuit 224 provided to the Nth channel produces an normalized A/D conversion code AD(N) given by the following equation:

$$AD(N)=(2^m-1)\times\{DOb(N)-DOa(N)\}/\{DOc(N)-DOa(N)\} \quad (2)$$

In the equation (2), DOa(N) represents digital data corresponding to the PB1(N) generated when the lamp wavelength voltage VL(N) starts increasing from 0 volt, DOb(N) represents digital data corresponding to the PB1(N) generated when the lamp wavelength voltage VL(N) becomes equal to the input voltage VB2, and DOc(N) represents digital data corresponding to the PB1(N) generated when the lamp wavelength voltage VL(N) becomes equal to a power supply voltage VDD.

Each calculation circuit 224 includes D-type flip-flops 224a-224c, subtractors (labeled "SUB" in FIG. 3) 224e, 224f, D-type flip-flops 224g, 224h, and a normalization circuit (labeled "N" in FIG. 3) 224i, and a D-type flip-flop 224j.

In the calculation circuit 224 provided to the first channel, the D-type flip-flops 224a-224c are connected in such a manner that digital data TDO(0) inputted from the encoder 255e is sequentially shifted and held. Each of the D-type flip-flops 224a-224c has a clock terminal for receiving the signal PB1 (0) through an inverter circuit 224d, and the digital data TDO(0) is held synchronously with a falling edge of the signal PB1(0). The subtractor 224e subtracts digital data TDO(0) held in the D-type flip-flop 224c from digital data TDO(0) held in the. D-type flip-flop 224b. The subtractor 224f subtracts digital data TDO(0) held in the D-type flip-flop 224c from digital data TDO(0) held in the D-type flip-flop 224a. Subtraction data outputted from the subtractors 224e, 224f are respectively held by the D-type flip-flops 224g, 224h synchronously with a rising edge of the signal PB1(0). The normalization circuit 224i performs a division operation of the data held by the D-type flip-flops 224g, 224h in accordance with the equation (1) to produce the A/D conversion code AD(0). The A/D conversion code AD(0) is outputted to the D-type flip-flop 224j and held by the D-type flip-flop 224j synchronously with the signal START(0). Thus, the signal VA2 is A/D converted to digital signal DVA by the A/D converter 220, and the digital signal DVA is outputted to the antilog amplifier 230.

Likewise, In the calculation circuit 224 provided to the Nth channel, the D-type flip-flops 224a-224c are connected in such a manner that digital data TDO(N) inputted from the encoder 255e is sequentially shifted and held. Each of the D-type flip-flops 224a-224c has a clock terminal for receiving the signal PB1(N) through an inverter circuit 224d, and the digital data TDO(N) is held synchronously with a falling edge of the signal PB1(N). The subtractor 224e subtracts digital data TDO(N) held in the D-type flip-flop 224c from digital data TDO(N) held in the D-type flip-flop 224b. The subtractor 224f subtracts digital data TDO(N) held in the D-type flip-flop 224c from digital data TDO(N) held in the D-type flip-flop 224a. Subtraction data outputted from the subtractors 224e, 224f are respectively held by the D-type flip-flops 224g, 224h synchronously with a rising edge of the signal PB1(N). The normalization circuit 224i performs a division operation of the data held by the D-type flip-flops 224g, 224h in accordance with the equation (2) to produce the A/D conversion code AD(N). The A/D conversion code AD(N) is outputted to the D-type flip-flop 224j and held by the D-type flip-flop 224j synchronously with the signal START(N). Thus, the signal VB2 is A/D converted to digital signal DVB by the A/D converter 220, and the digital signal DVB is outputted to the antilog amplifier 230.

Figure 4:
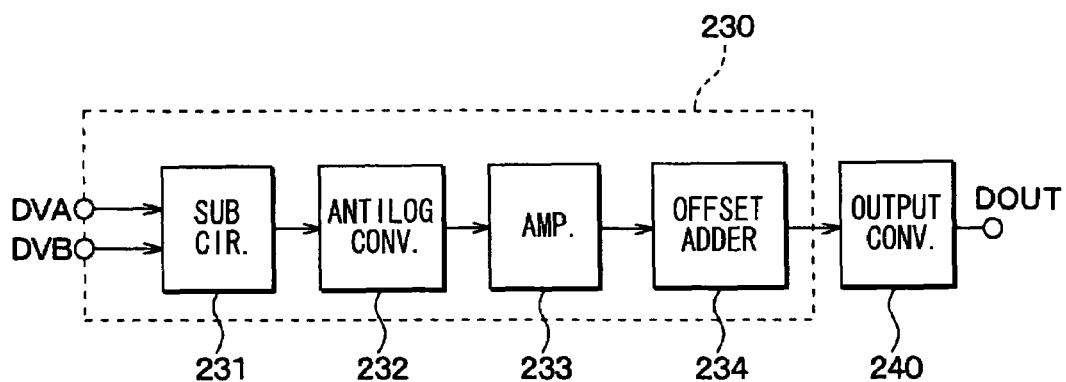
FIG. 4 is a diagram illustrating an antilogarithmic converter in the sensor apparatus of FIG. 1.

The antilog amplifier 230 performs an antilogarithmic conversion of the digital signals DVA, DVB received from the A/D converter 220. As shown in FIG. 4, the antilog amplifier 230 includes a subtraction circuit 231, an antilog converter 232, an amplifier 233, and an offset adder 234.

The subtraction circuit 231 calculates a difference between the digital signal DVA as the acceleration signal and the digital signal DVB as the reference signal to extract a logarithmic component of the acceleration signal.

The antilog converter 232 calculates an antilogarithm of the extracted logarithmic component of the acceleration signal. Thus, the acceleration signal returns to a linear signal. The amplifier 233 amplifies the linear acceleration signal outputted from the antilog converter 232 by a predetermined gain. The offset adder 234 performs corrections of the amplified acceleration signal. For example, the corrections can include a temperature correction, a power supply voltage correction, and/or a manufacturing variation correction. The corrected acceleration signal is outputted from the antilog amplifier 230 to the output converter 240.

The output converter 240 acts as an interface with an external circuit. In short, the output converter 240 is a SPI interface circuit. Thus, the acceleration signal can be outputted to outside of the sensor circuit through the output converter 240.

Operations of the sensor apparatus according to the present embodiment are described below with reference to FIG. 5. First, acceleration is detected by the sensor circuit 100 as follows.

The signal St is changed to a low level, and the midpoint voltage between the fixed electrodes 113, 114 is applied to the non-inverting input terminal of the operational amplifier 121a. In the present embodiment, as described above, the midpoint voltage is set to 2.5 volts. Therefore, unless acceleration is applied to the sensor circuit 100, the output of the operational amplifier 121a remains 2.5 volts.

Then, the signals PW1, PW2 having opposite voltage polarities are outputted from the signal generation circuit 124. In the present embodiment, each of the signals PW1, PW2 is a rectangular wave with an amplitude of 5 volts.

Specifically, a potential of the fixed electrode 113 becomes 5 volts based on the signal PW1, and a potential of the fixed electrode 114 becomes 0 volts based on the signal PW2. The switch 121c remains opened by the signal S1 received from the signal generation circuit 124. As a result, the capacitor 121b is charged according to positions of the movable electrodes 111, 112.

When a voltage corresponding to the electric charge stored in the capacitor 121b is outputted from the C/V conversion circuit 121, the S/H circuit 123a samples the output of the C/V conversion circuit 121 based on the control signal S2.

Then, the potential of the fixed potential 113 becomes 0 volts based on the signal PW1, and the potential of the fixed potential 114 becomes 5 volts based on the signal PW2. When the output of the C/V conversion circuit 121 becomes stable enough, the S/H circuit 123a samples the output of the C/V conversion circuit 121 based on the control signal S2.

The SCF circuit 123b executes differential operation between the sampled voltages by the S/H circuit 123a so that thermal characteristics and noise contained in the sampled voltages can cancel each other. Thus, the signals VA1, VA2 outputted from the SCF circuit 123b do not include the thermal characteristics and noise.

The signal VA1 has an acceleration component and the signal VB1 has a voltage level equal to the midpoint voltage (i.e., 2.5 volts). The signals VA1, VA2 are outputted to the logarithmic converter 210 of the signal processing circuit 200.

The logarithmic converter 210 logarithmically converts the linear signals VA1, VA2 to the logarithmic signals VB1, VB2, respectively. In other words, the linear signals VA1, VA2 are logarithmically compressed to the logarithmic signals VB1, VB2, respectively.

Figure 5:
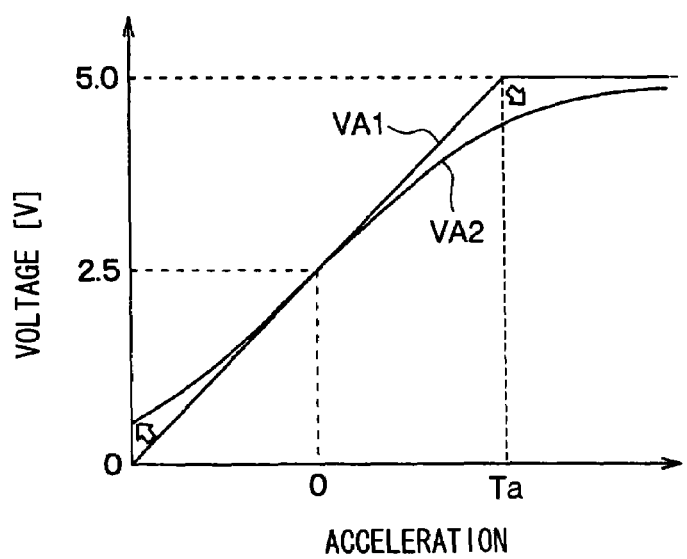
FIG. 5 is a graph illustrating a linear acceleration signal and a logarithmic acceleration signal corresponding to a logarithm of the linear acceleration signal.

For example, as shown in FIG. 5, the signal VA1 changes proportional to an acceleration applied to the sensor circuit 100 within a range where the acceleration is less than an acceleration value Ta. When the acceleration exceeds the acceleration value Ta, the signal VA1 is saturated to the power supply voltage (i.e., 5 volts). In contrast, the signal VA2 is not saturated, even when the acceleration exceeds the acceleration value Ta. Thus, a dynamic range of the sensor circuit 100 can be increased by logarithmically converting the signal VA1 to the signal VA2.

The logarithmic signals VA2, VB2 are A/D converted to the signals DVA, DVB by the A/D converter 220. Since the logarithmic signals VA2, VB2 are not saturated, the A/D converter 220 can convert the signals VA2, VB2 to the signals DVA, DVB without a reduction in a resolution. Thus, the signals VA2, VB2 can be converted to the signals DVA, DVB at high resolutions so that signal distortion can be prevented from occurring.

The signals DVA, DVB are outputted from the A/D converter 220 to the antilog amplifier 230. The subtraction circuit 231 of the antilog amplifier 230 calculates the difference between the signals DVA, DVB. In such an approach, an acceleration component corresponding to a change in acceleration is extracted from the signal DVA. Specifically, the signal DVA includes a reference component corresponding to the midpoint voltage of 2.5 volts. The subtraction circuit 231 subtracts the reference component from the signal DVA to obtain the acceleration component.

The acceleration component of the signal DVA is antilogarithmically converted to a linear digital signal by the antilog converter 232. The amplifier 233 amplifies the linear digital signal by the predetermined gain, which is not limited to the power supply voltage. The amplified digital signal is corrected by the offset adder 234 and then outputted from the antilog amplifier 230 to the output converter 240.

The amplified digital signal is outputted as a digital signal DOUT from the output converter 240 to outside of the sensor apparatus. The signal DOUT is used to achieve a vehicle control such as a airbag control or a sideslip prevention.

As described above, according to the present embodiment, the signals VA1, VB1 outputted from the sensor circuit 100 are logarithmically converted to the signals VA2, VB2. Then, the signals VA2, VB2 are A/D converted to the signals DVA, DVB. Then, the difference between the signals DVA, DVB is logarithmically converted to the signal DOUT.

As can be seen from FIG. 5, as the signals VA1, VB1 are smaller, the signals VA2, VB2 are larger. And, as the signals VA1, VB1 are larger, the signals VA2, VB2 are smaller. Therefore, the dynamic range of the sensor circuit 100 can be greatly increased by using the signals VA2, VB2.

The signals VA1, VB1 are digitalized after being converted to the signals VA2, VB2. In such an approach, even when the signals VA1, VB1 are small, the signals VA1, VB1 can be digitalized at high resolution so that high sensitivity can be ensured. Further, even when the signals VA1, VB1 are large, the signals VA1, VB1 can be digitalized without signal distortion so that high sensitivity can be ensured. Therefore, the signals VA1, VB1 can be converted to the signals DVA, DVB without signal distortion by using the signals VA2, VB2.

The signals DVA, DVB are antilogarithmically converted by the antilog converter 232 so that the dynamic range limitation due to the power supply voltage can be prevented. Thus, the sensor apparatus can have a wide dynamic range and a high sensitivity (i.e., high signal to noise ratio), so that the sensor apparatus can accurately detect the physical quantity over a wide range.

(Modifications)

The embodiments described above may be modified in various ways. For example, the sensor circuit 100 may detect a physical quantity other than acceleration. The logarithmic converter 210 and the antilog converter 232 may be eliminated, if the dynamic range can be ensured without logarithmic conversion.

The nonlinear signal processing circuit 200 can be implemented on a single semiconductor chip. The nonlinear signal processing circuit 200 can include a metal oxide semiconductor (MOS) transistor as an active element. Alternatively, the nonlinear signal processing circuit 200 can include a bipolar transistor as the active element. Alternatively, the nonlinear signal processing circuit 200 can include both the MOS transistor and the bipolar transistor as the active element.

Such changes and modifications are to be understood as being within the scope of the present invention as defined by the appended claims.

What is claimed is:

1. A sensor apparatus comprising:
   a sensor circuit that detects a physical quantity applied thereto and outputs a detection signal indicative of the detected physical quantity; and
   a signal processing circuit that processes the detection signal received from the sensor circuit,
   wherein the signal processing circuit includes a logarithmic converter, an analog-to-digital converter, and an antilogarithmic converter,
   wherein the logarithmic converter produces a logarithmic signal corresponding to a logarithm of the detection signal,
   wherein the analog-to-digital converter digitalizes the logarithmic signal, and
   wherein the antilogarithmic converter produces an antilogarithmic signal corresponding to an antilogarithm of the digitalized logarithmic signal.

2. The sensor apparatus according to claim 1,
   wherein the sensor circuit outputs a first signal indicative of the detected physical quantity and a second signal indicative of a reference physical quantity corresponding to when no physical quantity is applied to the sensor circuit,
   wherein the logarithmic converter produces first and second logarithmic signals respectively corresponding to logarithms of the first and second signals,
   wherein the analog-to-digital converter digitalizes the first and second logarithmic signals,
   wherein the signal processing circuit further includes a subtraction circuit that calculates a difference signal between the digitalized first and second logarithmic signals, the difference signal corresponding to a change in the detected physical quantity, and
   wherein the antilogarithmic converter produces an antilogarithmic signal corresponding to an antilogarithm of the difference signal.

3. The sensor apparatus according to claim 1,
   wherein the signal processing circuit further includes an offset circuit that performs an offset correction of the antilogarithm signal.

4. The sensor apparatus according to claim 1,
   wherein the signal processing circuit further includes an output converter though which the antilogarithmic signal is outputted to an external circuit.

5. The sensor apparatus according to claim 1,
   wherein the signal processing circuit is implemented as a single semiconductor chip.

6. The sensor apparatus according to claim 1,
   wherein the signal processing circuit has an active element, and
   wherein the active element includes a metal oxide semiconductor transistor.

7. The sensor apparatus according to claim 1,
   wherein the signal processing circuit has an active element, and
   wherein the active element includes a bipolar transistor.

8. The sensor apparatus according to claim 1,
   wherein the signal processing circuit has an active element, and
   wherein the active element includes both a metal oxide semiconductor transistor and a bipolar transistor.

* * * * *